US010037012B2

United States Patent
Ohnishi

(10) Patent No.: US 10,037,012 B2
(45) Date of Patent: Jul. 31, 2018

(54) POWER SUPPLY DEVICE, POWER SUPPLY CONTROL METHOD FOR THE SAME, AND RECORDING MEDIUM

(71) Applicant: NEC Platforms, Ltd, Kawasaki-shi, Kanagawa (JP)

(72) Inventor: Masahiro Ohnishi, Kanagawa (JP)

(73) Assignee: NEC PLATFORMS, LTD., Kanagawa (JP)

( * ) Notice: Subject to any disclaimer, the term of this patent is extended or adjusted under 35 U.S.C. 154(b) by 189 days.

(21) Appl. No.: 15/227,064

(22) Filed: Aug. 3, 2016

(65) Prior Publication Data

US 2017/0077796 A1 Mar. 16, 2017

(30) Foreign Application Priority Data

Sep. 10, 2015 (JP) .................................. 2015-178356

(51) Int. Cl.
| | |
|---|---|
| *H02M 1/00* | (2006.01) |
| *H02M 7/02* | (2006.01) |
| *H02M 7/42* | (2006.01) |
| *G05B 13/02* | (2006.01) |
| *H02M 7/44* | (2006.01) |
| *H02M 7/04* | (2006.01) |

(52) U.S. Cl.
CPC ............. *G05B 13/026* (2013.01); *H02M 7/04* (2013.01); *H02M 7/44* (2013.01); *H02M 2001/0025* (2013.01)

(58) Field of Classification Search
CPC ............................... G05B 13/026; H02M 7/00
See application file for complete search history.

(56) References Cited

U.S. PATENT DOCUMENTS

| | | | | |
|---|---|---|---|---|
| 2006/0259621 | A1* | 11/2006 | Ranganathan | .......... G06F 1/206 709/226 |
| 2010/0332863 | A1* | 12/2010 | Johnston | .................... G06F 1/26 713/300 |
| 2013/0169172 | A1* | 7/2013 | Kesterson | .......... H05B 33/0815 315/186 |
| 2016/0378168 | A1* | 12/2016 | Branover | .............. G06F 1/3287 713/323 |

FOREIGN PATENT DOCUMENTS

| | | |
|---|---|---|
| JP | 2006-020417 A | 1/2006 |
| JP | 2008-046915 A | 2/2008 |

* cited by examiner

*Primary Examiner* — Mark Connolly

(57) ABSTRACT

Disclosed is a power supply device capable of optimizing a conversion efficiency of power so as to be able to supply, in accordance with an operation status of a load that is a supply target of power, power necessary for the load.
The power supply device (40) includes a control unit (41) that refers to, on the basis of new power prediction information (101R), a storage unit (3) that stores power information (103) in which power prediction information (101S) indicating a prediction value of power and output power information (102S) indicating an output power value, determines a reference value, and controls a power conversion unit (4) to adjusts a power conversion efficiency in accordance with the determined reference value.

10 Claims, 10 Drawing Sheets

Fig.3

| SELECT SIGNAL | REQUEST INFORMATION |
|---|---|
| A | 0h |
| B | 1h |
| C | 2h |
| D | 3h |

Fig.4

| REQUEST INFORMATION | CONVERSION EFFICIENCY |
|---|---|
| 0h | 70 |
| 1h | 85 |
| 2h | 90 |
| 3h | 80 |

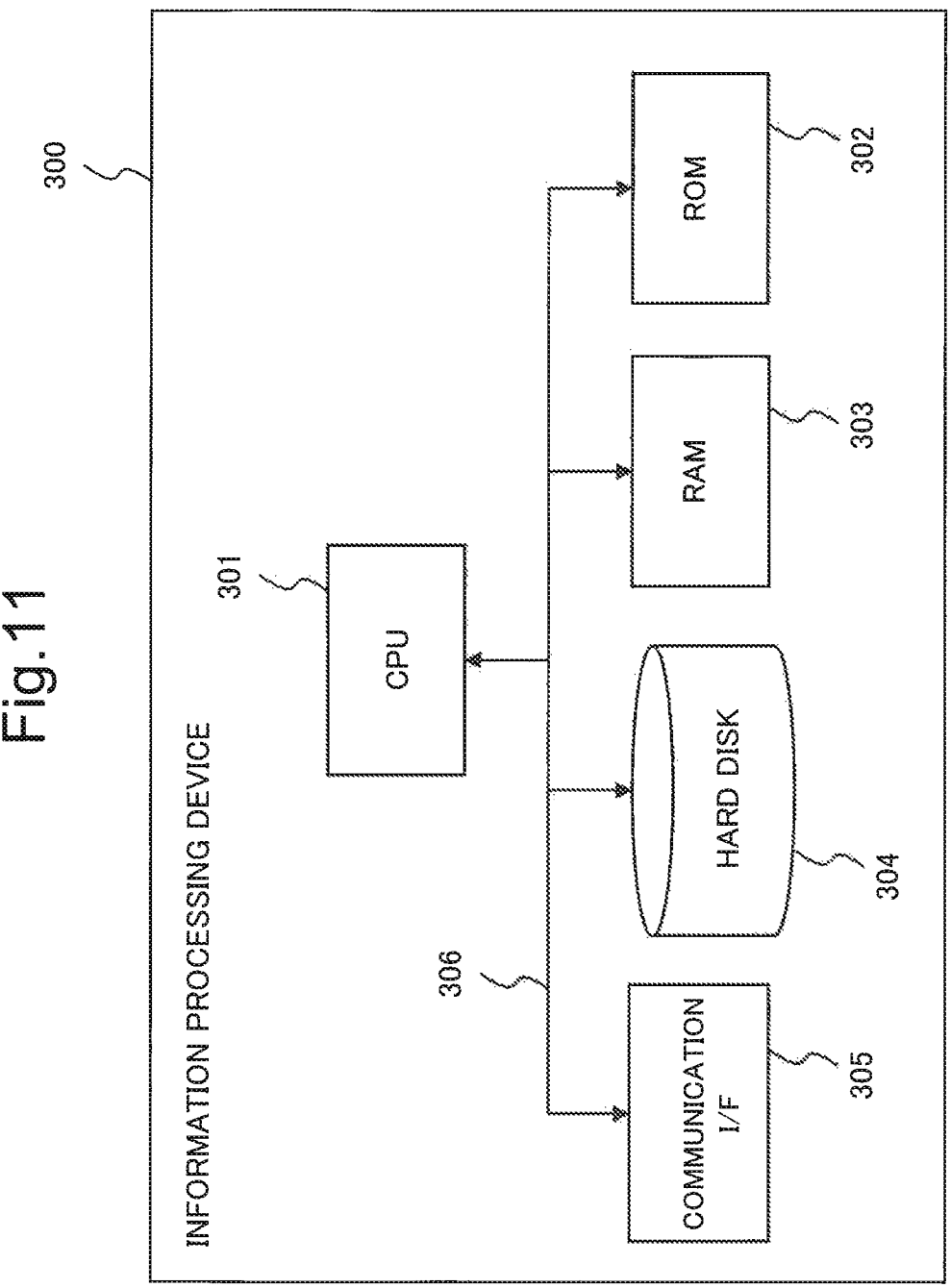

POWER SUPPLY DEVICE, POWER SUPPLY CONTROL METHOD FOR THE SAME, AND RECORDING MEDIUM

This application is based upon and claims the benefit of priority from Japanese Patent Application No. 2015-178356, filed on Sep. 10, 2015, the disclosure of which is incorporated herein in its entirety by reference.

TECHNICAL FIELD

The present invention relates to a technical field in which a conversion efficiency between input power and output power of a power supply device is optimized.

BACKGROUND ART

With growing awareness for environmental problems in recent years, electronic devices that operate with less power consumption have been spread rapidly. For instance, in a process of generating power necessary to drive an electronic device, reduction of power lost in the power supply device is a major subject from the viewpoint of realizing power saving. As a method for reducing this power loss, a feedback method is known. In other words, the method detects a state of power output from the power supply device. The method controls output power in accordance with the detected state of power. When the feedback method is adopted, the power supply device can optimize a power conversion efficiency (hereinafter, in the present application, referred to simply as "conversion efficiency") upon conversion from DC power to AC power, for example. As existing related technologies, there are, for example, technologies disclosed in PTL 1 and PTL 2, in addition to the above-described feedback method.

PTL 1 discloses a technology relating to a circuit board structure. The circuit board structure includes a plurality of parameter circuits in each of which an operation is specified by a parameter, a selection circuit that selects any one of the parameter circuits, and an output circuit that outputs a parameter included in the parameter circuit selected by the selection circuit. The plurality of parameter circuits include parameters different from each other for the respective parameter circuits. Therefore, the output circuit can output a different parameter by using a selected parameter circuit. In other words, a reception circuit that receives a parameter can receive a different parameter from the output circuit. PTL 1 is Japanese Laid-open Patent Publication No. 2008-046915.

PTL 2 discloses a technology relating to a control device and a method that control a power conversion device. PTL 2 discloses a technology for controlling a power conversion device to adjust, for example, the conversion efficiency to be a target conversion efficiency. PTL 2 is Japanese Laid-open Patent Publication No. 2006-020417.

PTL 1 merely describes that the parameter included in the parameter circuit selected by the selection circuit is output. In other words, PTL 1 neither considers reduction of power lost in a process of generating power nor mentions anything about this matter.

In the control device disclosed in PTL 2, DC power output from a DC power supply facility such as a solar photovoltaic system is converted to AC power by using a power conversion device. The control device determines a conversion efficiency of power in the power conversion device on the basis of the DC power output from the DC power supply facility and the AC power obtained by the conversion. The control device controls the power conversion device to adjust the determined conversion efficiency of power to be a target conversion efficiency. In this manner, the control device disclosed in PTL 2 corrects (hereinafter, described also as "post-correct") the conversion efficiency on the basis of an output value output from the DC power supply facility. In other words, the control device corrects the conversion efficiency by using the above-described feedback method. Therefore, in PTL 2, it may be difficult to control the conversion efficiency to be a target conversion efficiency at an optimal timing. As a result, in PTL 2, it may be difficult to reduce the power loss in the power conversion device.

In this manner, in the method for optimizing the conversion efficiency of power in accordance with the state of output power, not only is it difficult to follow power consumed in the electronic device, but there is also a limit to reduction of power to be lost. In other words, it may be difficult to sufficiently produce a power reduction effect with this method.

A main object of the present invention is to provide a power supply device and the like capable of optimizing a conversion efficiency of power so as to be able to supply, in accordance with an operation status of a load that is a supply target of power, power necessary for the load.

SUMMARY

In order to achieve the above problem, a power supply device according to one aspect of the present invention includes the following configuration.

That is, a power supply device according to one aspect of the present invention includes:

by referring to, on a basis of new power prediction information, a storage unit that stores power information in which, out of power prediction information indicating a prediction value of power necessary to operate a load that is a supply target of power, past power prediction information and output power information indicating a power value output when the load actually operates for a prediction value of the past power prediction information are associated with each other, determines the specific output power information associated with the past power prediction information included in the power information which corresponds to the new power prediction information;

determines a reference value on a basis of the determined specific output power information; and controls a power supply conversion unit to adjust, in accordance with the reference value, a power conversion efficiency upon conversion from input power into output power by the power supply conversion unit.

Further, in order to achieve the same object, a power control method according to one aspect of the present invention includes the following configuration.

That is, a power control method according to one aspect of the present invention includes, causing an information processing device to:

by referring to, on a basis of new power prediction information, a storage unit that stores power information in which, out of power prediction information indicating a prediction value of power necessary to operate a load that is a supply target of power, past power prediction information and output power information indicating a power value output when the load actually operates for a prediction value of the past power prediction information are associated with each other, determining the specific output power information associated with the past power prediction information included in the power information which corresponds to the new power prediction information;

determining a reference value on a basis of the determined specific output power information; and controlling a power supply conversion unit to adjust, in accordance with the reference value, a power conversion efficiency upon conversion from input power into output power by the power supply conversion unit.

The same object is also achieved by a computer program that causes a computer to realize the power supply device and the power control method including the above respective configurations, and a computer readable recording medium storing the computer program.

According to the present invention, it is possible to provide a power supply device and the like capable of optimizing a conversion efficiency of power so as to be able to supply, in accordance with an operation status of a load that is a supply target of power, power necessary for the load.

BRIEF DESCRIPTION OF THE DRAWINGS

Exemplary features and advantages of the present invention will become apparent from the following detailed description when taken with the accompanying drawings in which:

FIG. 3 is a diagram specifically exemplifying output unit selection information in the second exemplary embodiment of the present invention;

FIG. 4 is a diagram conceptually exemplifying combinations of request information and a conversion efficiency in the second exemplary embodiment of the present invention;

FIG. 11 is a diagram exemplarily illustrating a configuration of an information processing device (computer) 300 capable of executing a function of at least a control unit in a power supply device according to a typical exemplary embodiment of the present invention.

EXEMPLARY EMBODIMENT

Hereinafter, exemplary embodiments of the present invention will be described in detail with reference to the accompanying drawings.

First Exemplary Embodiment

Figure 1:
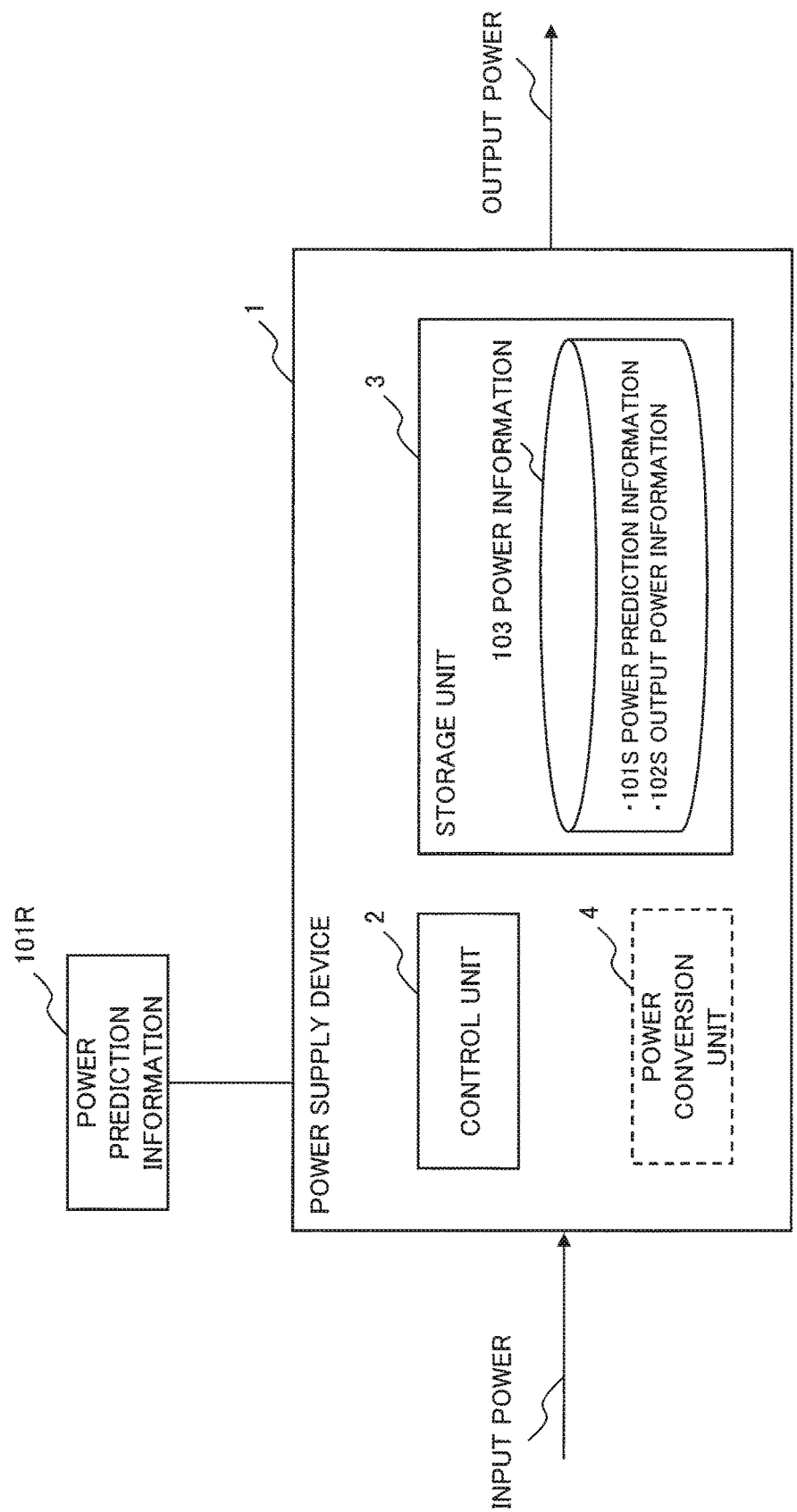
FIG. 1 is a block diagram illustrating a configuration of a power supply device in a first exemplary embodiment of the present invention.

FIG. 1 is a block diagram illustrating a configuration of a power supply device 1 in a first exemplary embodiment of the present invention.

In FIG. 1, the power supply device 1 includes a control unit 2 and a storage unit 3.

In the following description, for convenience of description, information indicating a prediction value of power necessary to operate a load (not illustrated) that is a supply target of power will be referred to as power prediction information. In the following description, with respect to the power prediction information, that is newly inputted into the power supply device 1 will be referred to as power prediction information 101R. In the following description, past power prediction information already stored on the storage unit 3 will be referred to as power prediction information 101S.

In the following description, for convenience of description, information indicating a power value outputted from the power supply device 1 to a load will be referred to as output power information. In the following description, regarding the output power information, when the load is actually operating for power prediction information 101R, information concerning the output a power value will be referred to as output power information 102R. In the following description, past output power information already stored on the storage unit 3 will be referred to as output power information 102S.

The storage unit 3 stores power information 103 in which power prediction information 101S and output power information 102S are associated with each other. In other words, the storage unit 3 can store the power information 103 in which, for example, information listed below to be input in each predetermined time period are associated with each other.

Past power prediction information 101S and

Output power information 102S indicating the power value outputted when the load actually operates for the prediction value indicated by the power prediction information 101S.

More specifically, as one example, a configuration may be employed that the storage unit 3 stores the power information 103 in which power prediction information 101R and output power information 102R are associated with each other, in the order of being obtained from a load, as power prediction information 101S and output power information 102S, respectively. Alternatively, a configuration may be employed which the storage unit 3 stores, as the power information 103, power prediction information 101S and output power information 102S while being associated with each other for each prediction value indicated by power prediction information 101R. However, the present invention described using the present exemplary embodiment as an example is not limited to the above-described configurations (hereinafter, the same applies for each exemplary embodiment).

A configuration may be employed which, for example, output power information 102R and 102S are output by a power conversion unit 4 to be described later. Alternatively, for the output power information 102R and 102S, a power value of output power measured using a measurement unit that is not illustrated may be employed. However, the present invention described using the present exemplary embodiment as an example is not limited to the above-described examples (hereinafter, the same applies for each exemplary embodiment).

In the present exemplary embodiment, the load refers to, for example, a computer circuit, a device including the computer circuit, or an electronic device such as an information processing device or the like necessary to be supplied with power by the power supply device 1.

The control unit 2 refers to, in accordance with an input of new power prediction information 101R to the power supply device 1, the power information 103 on the basis of the power prediction information 101R. As a result of the reference, the control unit 2 determines power prediction information 101S corresponding to the power prediction information 101R. The control unit 2 determines specific output power information 102S associated with the determined power prediction information 101S. The control unit 2 determines a reference value on the basis of the determined specific output power information 102S. In other words, the control unit 2 determines power prediction information 101S indicating the same prediction value as a prediction value of new power prediction information 101R. The control unit 2 determines the reference value on the basis of specific output power information 102S associated with the determined power prediction information 101S.

More specifically, as one example, the control unit 2 refers to the power information 103 on the basis of input power prediction information 101R. The control unit 2 determines specific output power information 102S associated with power prediction information 101S corresponding to the power prediction information 101R. The control unit 2 may determine, on the basis of specific output power information 102S, an average value of power values indicated by the specific output power information 102S as the reference value. Hereinafter, in the present application, the average value of power values will be referred to simply as the "average value."

In this case, the average value may be determined using, all the output power information 102S that is associated with corresponding power prediction information 101S out of power information 102S included in the power information 103. The average value may be determined using specific output power information 102S stored over a predetermined period out of specific output power information 102S associated with power prediction information 101S in the power information 103. Alternatively, the average value is changed in accordance with power prediction information 101R newly input to the power supply device 1. Therefore, the average value can be regarded as a moving average value. In other words, it is assumed that a configuration is employed in which the average value is determined using target output power information 102S out of output power information 102S associated with power prediction information 101S in the power information 103.

However, the present invention described using the present exemplary embodiment as an example is not limited to the above-described configuration. The control unit 2 may determine, as the reference value, for example, a power value indicated by output power information 102S having the highest appearance ratio out of output power information 102S associated with power prediction information 101S in the power information 103 (hereinafter, the same applies for each exemplary embodiment).

The control unit 2 outputs, to the power conversion unit 4, control information that issues an instruction for adjusting a power conversion efficiency (hereinafter, in the present application, referred to simply as "conversion efficiency") upon conversion from input power input to the power conversion unit 4 into output power, in accordance with the determined reference value. In other words, the control unit 2 outputs, to the power conversion unit 4, control information that issues an instruction for adjusting a conversion efficiency on the basis of the conversion efficiency previously set in accordance with the reference value. In other words, the control unit 2 outputs, to the power conversion unit 4, control information indicating a different instruction content in accordance with the reference value.

In the present exemplary embodiment, it is assumed that, for example, a combination of the reference value and the conversion efficiency is previously set.

More specifically, as one example, it is assumed that when a switching element is employed for the power conversion unit 4, control information includes information at least representing a switching cycle that switches the ON state and the OFF state of the switching element. However, the present invention described using the present exemplary embodiment as an example is not limited to the one example described above.

In this case, the conversion efficiency refers to a value represented by a ratio between input power input to the power supply device 1 and output power output from the power supply device 1.

In the following description, the power conversion unit 4 that converts power in accordance with control information output from the control unit 2 will be described. For the power conversion unit 4 illustrated in FIG. 1, a configuration included in the power supply device 1 is exemplified. However, the exemplary embodiments according to the present invention are not limited to the configuration. A configuration may be employed which the power conversion unit 4 is not included in the power supply device 1. Therefore, the power conversion unit 4 illustrated in FIG. 1 is illustrated using a dashed line.

The power conversion unit 4 converts the input power to output power in accordance with control information. The power conversion unit 4 outputs the converted power (output power) to the load. In other words, the power conversion unit 4 can optimize a power conversion efficiency by converting power in accordance with the conversion efficiency indicated by control information.

More specifically, as one example, the power conversion unit 4 includes a function for converting AC power provided from an external source (e.g. an input power supply that is not illustrated) to DC power. Alternatively, the power conversion unit 4 includes a function for converting DC power provided from an external source that is not illustrated to AC power.

As a technology itself in which the power conversion unit 4 converts input power to output power, a common technology is now employable. Therefore, detailed description in the present exemplary embodiment will be omitted (hereinafter, the same applies for each exemplary embodiment).

In this manner, according to the power supply device 1 of the present exemplary embodiment, it is possible to optimize the conversion efficiency of power so as to be able to supply, in accordance with an operation status of the load that is a supply target of power, power necessary for the load. The reason is as follows.

The power supply device 1 includes the control unit 2. In other words, the control unit 2 determines power prediction information 101S included in the power information 103 on the basis of power prediction information 101R. The control unit 2 determines the reference value on the basis of specific output power information 102S associated with the power prediction information 101S. The control unit 2 outputs control information for instructing to adjust the power conversion efficiency according to the determined reference value obtained toward the power conversion unit 4. As a result, the power supply device 1 can supply more accurate power, compared to the supplying power on the basis of information including only power prediction information 101R.

Further, the power supply device 1 controls the power conversion unit 4 on the basis of power prediction information 101R that predicts power necessary for the load. Therefore, the power supply device 1 can control the power conversion unit 4 to supply power by following an operation status of the load, compared with the feedback method described above in BACKGROUND ART. As a result, the power supply device 1 can optimize the conversion efficiency in the power conversion unit 4. Further, the power supply device 1 can reduce power lost in a process for generating power necessary to drive an electronic device. In other words, the power supply device 1 can obtain power saving.

In this manner, the power supply device 1 can determine an optimal reference value using information included in the power information 103 on the basis of power prediction information 101R. In other words, the power supply device 1 can determine the reference value on the basis of a past result value. Therefore, the power supply device 1 can supply power to the load more quickly and more precisely.

Second Exemplary Embodiment

The second exemplary embodiment based on the power supply device 1 according to the first exemplary embodiment of the present invention will be described. In the following description, characteristic portions according to the present exemplary embodiment will be mainly described. In the following description, the components similar to the above-described exemplary embodiment are assigned with the same reference numerals, and therefore, overlapping description will be omitted.

A power supply device 10 in the second exemplary embodiment of the present invention will be described with reference to FIG. 2 and FIG. 3.

However, also in the present exemplary embodiment, a relation between power prediction information 101R and power prediction information 101S is the same as the relation described in the first exemplary embodiment. Further, in the following description, a relation between output power information 102R and output power information 102S is the same as the relation described in the first exemplary embodiment (hereinafter, the same applies for each exemplary embodiment).

Figure 2:
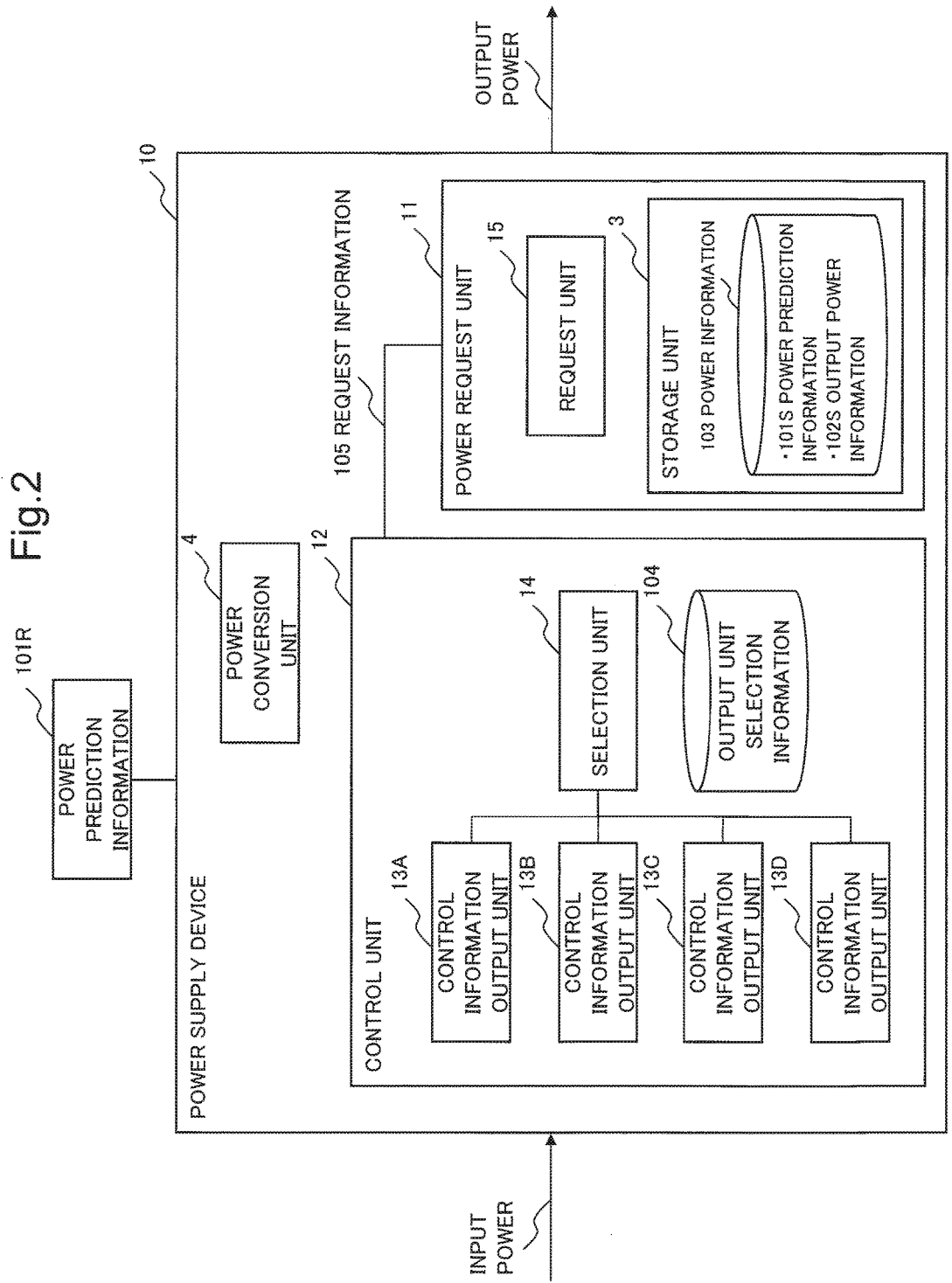
FIG. 2 is a block diagram illustrating a configuration of the power supply device in a second exemplary embodiment of the present invention.

FIG. 2 is a block diagram illustrating a configuration of the power supply device 10 in the second exemplary embodiment of the present invention.

In FIG. 2, the power supply device 10 roughly includes a power request unit 11, a control unit 12, and a power conversion unit 4.

The power request unit 11 includes a request unit 15, a storage unit 3, and power information 103.

The request unit 15 refers to, in accordance with an input of new power prediction information 101R to the power supply device 10, the power information 103 on the basis of the input power prediction information 101R. As a result of the reference, the control unit 12 determines the reference value on the basis of specific output power information 102S associated with power prediction information 101S corresponding to the power prediction information 101R.

The request unit 15 generates request information 105 for the adjustment of the conversion efficiency in accordance with the determined reference value. The request unit 15 outputs the generated request information 105 toward the control unit 12.

In the present exemplary embodiment, it is assumed that, for example, the reference value and the request information 105 are previously set. The request information 105 refers to information requesting an adjustment to a better conversion efficiency. More specifically, a configuration may be employed which the request information 105 includes, for example, information capable of identifying a desired conversion efficiency. Alternatively, a configuration may be employed which the request information 105 includes, for example, information capable of identifying a parameter circuit 25 that will be described in Specific Example of the Second Exemplary Embodiment to be described later. The request information 105 will be described later with reference to FIG. 3 in the present exemplary embodiment.

In FIG. 2, the control unit 12 includes four control information output units 13 (control information output units 13A to 13D), a selection unit 14, and output unit selection information 104.

In the present exemplary embodiment, in the following description, for convenience of description, a first control information output unit, a second control information output unit, a third control information output unit, and a fourth control information output unit will be referred to as the control information output unit 13A, 13B, 13C, and 13D, respectively. In the following description, for convenience of description, For the four control information output units 13A to 13D, a specific control information output unit is not specified, it will be simply referred to as a control information output unit 13.

The selection unit 14 executes the following processing on the basis of request information 105 obtained from the request unit 15 and the output unit selection information 104. In other words, the selection unit 14 selects any one control information output unit 13 out of the four control information output units 13 on the basis of the request information 105 output from the request unit 15 and the output unit selection information 104. In other words, the selection unit 14 selects the specific control information output unit 13 out of the four control information output units 13.

The output unit selection information 104 includes information in which request information 105 and information indicating a select signal capable of specifying the control information output unit 13 are previously associated with each other. The output unit selection information 104 will be described later with reference to FIG. 3 in the present exemplary embodiment.

More specifically, the selection unit 14 refers to the output unit selection information 104 on the basis of request information 105. The selection unit 14 acquires information capable of identifying the specific control information output unit 13 associated with the request information 105 from the output unit selection information 104. For example, a configuration may be employed which the selection unit 14 acquires, as information capable of executing the identification, information indicating a select signal capable of specifying the specific control information output unit 13 from the output unit selection information 104.

The selection unit 14 outputs the select signal toward the specific control information output unit 13, on the basis of the acquired information indicating the select signal. In other words, the select unit 14 generates, on the basis of the acquired information indicating a select signal, the select signal. The selection unit 14 outputs the generated select signal toward the specific control information output unit 13.

A configuration may be employed which, for example, when the select signal is output to the specific control information output unit 13, the selection unit 14 can adjust a time interval for the output. Thereby, the power supply device 10 can supply, at a timing when the load (not illustrated) needs power, output power to the load. As a result, the power supply device 10 can reduce a difference between power consumed by the load and the output power.

In the following description, the output unit selection information 104 and the request information 105 will be described with reference to FIG. 3. FIG. 3 is a diagram specifically exemplifying the output unit selection information 104 in the second exemplary embodiment of the present invention.

In the output unit selection information 104 illustrated in a table form in FIG. 3, the first column represents information indicating the select signal. The second column represents request information 105. It is assumed that the request information 105 illustrated in FIG. 3 is represented, as one example, using four bits of information "0 h (hexadecimal)," "1 h," "2 h," and "3 h."

A configuration may be employed which the output unit selection information 104 includes an optimal combination between request information 105 and the control information output unit 13 previously defined on the basis of various types of information such as an output value of power obtained upon operating the power supply device 10.

In the present exemplary embodiment, a configuration has been exemplified which the output unit selection information 104 illustrated in FIG. 3 includes information where four request information 105 and information indicating the select signal are associated with each other. However, a configuration may be employed which the output unit selection information 104 includes information where one or more supposed request information 105 and information indicating the select signal corresponding to the request information 105 are associated with each other.

In the following description, the control information output unit 13 will be described. FIG. 4 is a diagram conceptually exemplifying combinations of request information 105 and the conversion efficiency in the second exemplary embodiment of the present invention.

The control information output unit 13 outputs, to the power conversion unit 4, control information that issues an instruction for adjusting the conversion efficiency in the power conversion unit 4 on the basis of the conversion efficiency set in accordance with request information 105.

As illustrated in FIG. 4, it is assumed that, for example, the request information 105 and the conversion efficiency are previously set. The first column in FIG. 4 represents request information. The second column represents the conversion efficiency.

More specifically, for the four control information output units 13 (the control information output units 13A to 13D), conversion efficiencies different from each other are previously set, respectively. In other words, this means that in the present exemplary embodiment, four conversion efficiencies are set in accordance with request information 105 as illustrated in FIG. 4. Therefore, when, for example, the power conversion unit 4 is controlled using a plurality of conversion efficiencies, the control unit 12 can be realized by including a plurality of control information output units 13 corresponding to the conversion efficiencies. In other words, a configuration may be employed in which the control unit 12 includes one or more control information output units 13 in accordance with a number of desired conversion efficiencies.

In this case, from the one or more control information output units 13, the specific output information output unit 13 selected by the selection unit 14 executes the following processing on the basis of a previously set conversion efficiency. In other words, the specific control information output unit 13 outputs, toward the power conversion unit 4, control information that issues an instruction for adjusting the conversion efficiency in accordance with an input of the select signal from the selection unit 14.

For convenience of description, as one example, an example has been described which the request unit 15 outputs request information 105 in accordance with a determined reference value to the control unit 12. However, the exemplary embodiments of the present invention are not limited to the example. As one example, the request unit 15 determines whether it is necessary to adjust the conversion efficiency on the basis of the determined reference value and specific output power information 102S used upon determining the reference value. The request unit 15 may output request information 105 in accordance with the determination result to the control unit 12. In other words, the request unit 15 may output the request information 105 to the control unit 12 when determining that it is necessary to adjust the conversion efficiency.

In this case, the request unit 15 compares the determined reference value and specific output power information 102S. As a result of the comparison, the request unit 15 may determine that it is necessary to adjust the conversion efficiency when the specific output power information 102S has a value higher than the determined reference value or the specific output power information 102S has a value lower than the determined reference value. However, the present invention described using the present exemplary embodiment as an example is not limited to the above-described configurations (hereinafter, the same applies for each exemplary embodiment).

In this manner, according to the power supply device 10 of the present exemplary embodiment, it is possible to produce the effect described in the first exemplary embodiment and optimize, at a timing necessary for the load that is a supply target of power, the conversion efficiency of power so as to be able to supply the necessary power.

The reason is that the power supply device 10 includes the selection unit 14 and one or more control information output units 13. In other words, the selection unit 14 can select a specific control information output unit 13 capable of outputting optimal control information to the power conversion unit 4 out of the one or more control information output units 13 on the basis of request information 105. The control information output unit 13 can execute the following processing in accordance with an input of a select signal from the selection unit 14. In other words, the control information output unit 13 can output, to the power conversion unit 4, control information that issues an instruction for adjusting the conversion efficiency upon conversion of power by the power conversion unit 4 using a previously set conversion efficiency.

Specific Example of the Second Exemplary Embodiment

Next, a specific example according to the second exemplary embodiment based on the power conversion device 10 according to the second exemplary embodiment of the present invention described above will be described. In the following description, characteristic portions according to the specific example will be mainly described. In the following description, the same components as in the exemplary embodiments described above are assigned with the same reference numerals, and therefore, overlapping description will be omitted.

A power supply device 20 in the specific example according to the second exemplary embodiment of the present invention will be described with reference to FIG. 3 to FIG. 9.

In the following description, for convenience of description, as one example, operations in which the power supply device 20 is realized using a circuit configuration to be described later will be described.

Figure 5:
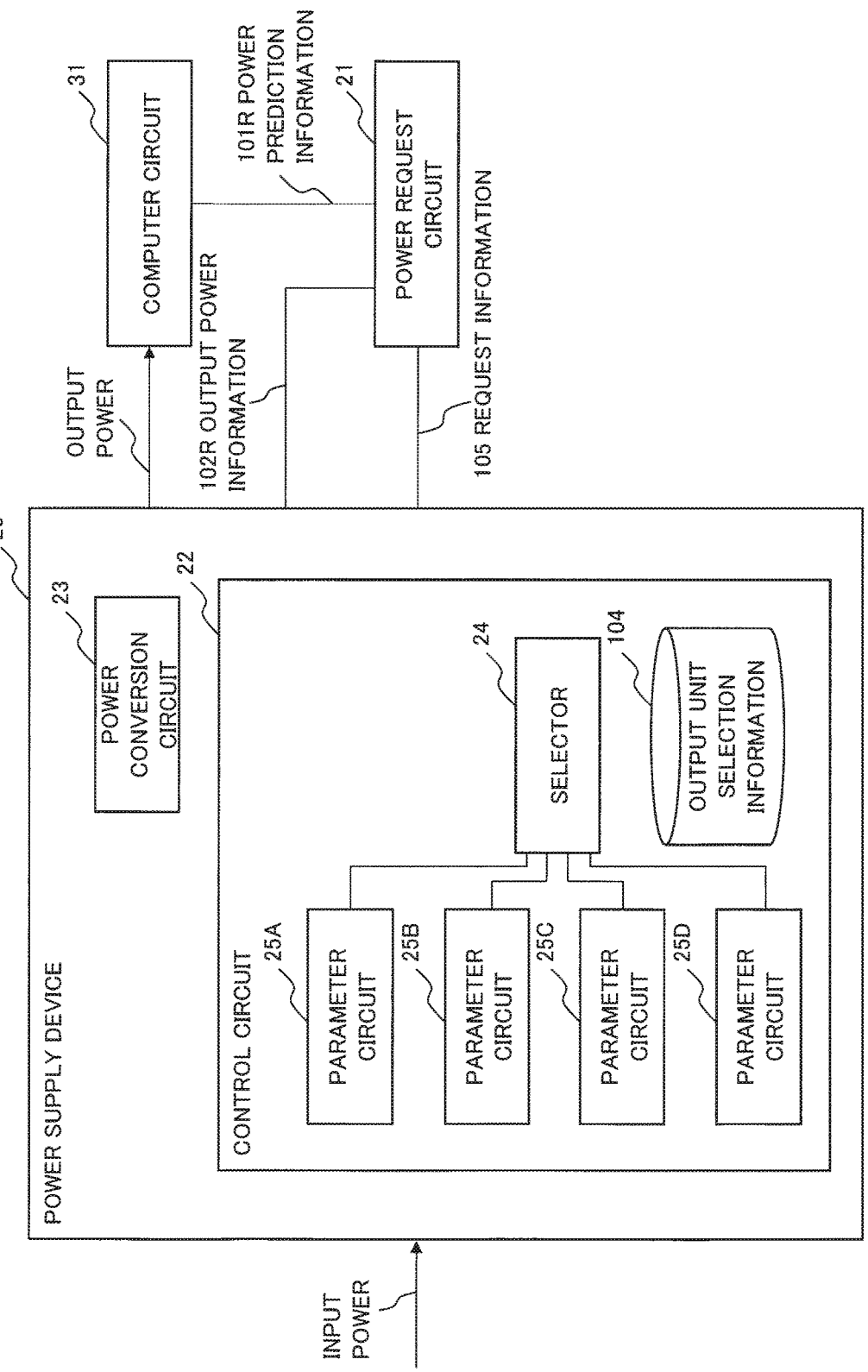
FIG. 5 is a diagram exemplifying a configuration of the power supply device in a specific example according to the second exemplary embodiment of the present invention.

FIG. 5 is a diagram exemplifying a configuration of the power supply device 20 in the specific example according to the second exemplary embodiment of the present invention.

In FIG. 5, the power supply device 20 roughly includes a power request circuit 21, a control circuit 22, and a power conversion circuit 23.

Figure 6:
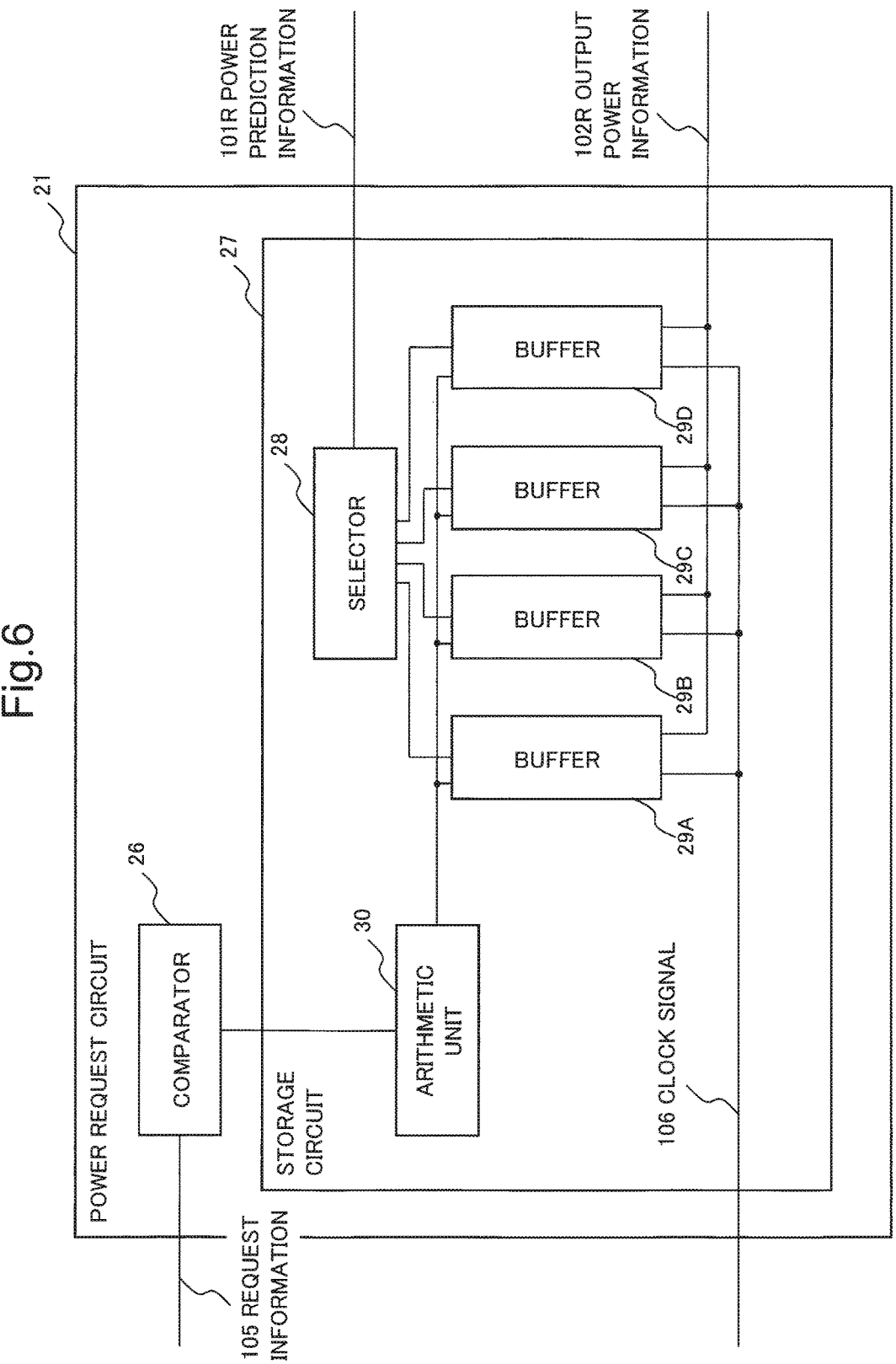
FIG. 6 is a diagram exemplifying a configuration of a power request circuit in the specific example according to the second exemplary embodiment of the present invention.

FIG. 6 is a diagram exemplifying a configuration of the power request circuit 21 in the specific example according to the second exemplary embodiment of the present invention.

In FIG. 6, the power request circuit 21 roughly includes a comparator 26 and a storage circuit 27. The storage circuit 27 includes a selector (second selector) 28, four buffers 29 (buffers 29A to 29D), and an arithmetic unit 30.

In the following description, for convenience of description, For the four buffers 29A to 29D, a specific buffer is not specified, it will be simply referred to as a buffer 29.

The comparator 26 is equivalent to the request unit 15 described in the second exemplary embodiment. The storage circuit 27 is equivalent to the storage unit 3 described in the first exemplary embodiment. The buffers 29A to 29D each are a specific component example that holds (stores) the power information 103 described in the first exemplary embodiment.

More specifically, the selector 28 of the storage circuit 27 selects any one buffer 29 of the buffers 29A to 29D on the basis of a state (prediction value) indicated by power prediction information 101R. The buffer 29 selected by the selector 28 accumulates output power information 102R, for example, in accordance with a clock signal 106.

In the present specific example, a configuration may be employed which the power request circuit 21 includes four buffers 29 will be described as an example. However, a configuration may be employed which the buffers 29 of only a number equivalent to a prediction value indicated by power prediction information 101R supposed in a computer circuit 31 to be described later are provided. Employable is a configuration in which the power request circuit 21 includes one or more buffers 29. In other words, the buffer 29 may be provided for each prediction value indicated by the power prediction information 101R.

In the present specific example, a configuration may be employed which the buffer 29 accumulates, for example, output power information 102R over a predetermined period. In this case, a configuration may be employed which, for example, while sequentially accumulating newly obtained output power information 102R, the buffer 29 discards already accumulated output power information 102S. In other words, a configuration may be employed which while sequentially storing output power information 102R using a rotary-buffer method, the buffer 29 discards past output power information 102S.

The arithmetic unit 30 always monitors the buffer 29 selected by the selector 28. The arithmetic unit 30 determines an average value of power values indicted by specific output power information 102S accumulated on the selected buffer 29. The arithmetic unit 30 outputs the determined average value toward the comparator 26 as the reference value.

The comparator 26 compares the average value determined by the arithmetic unit 30 and a range of a predetermined power value previously set. As a result of the comparison, when the average value falls within the range of the predetermined power value, the comparator 26 outputs request information 105 associated with the range of the predetermined power value toward the control circuit 22.

In this case, it is assumed that the comparator 26 is previously set with, for example, ranges of a plurality of predetermined power values and request information 105 associated with the ranges of the predetermined power values.

In FIG. 5, the control circuit 22 includes a selector (first selector) 24, four parameter circuits 25 (parameter circuits 25A to 25D), and output unit selection information 104.

In the present specific example, in the following description, for convenience of description, a first parameter circuit, a second parameter circuit, a third parameter circuit, and a fourth parameter circuit will be referred to as the parameter circuit 25A, the parameter circuit 25B, the parameter circuit 25C, and the parameter circuit 25D, respectively. In the following description, For the four parameter circuits 25A to 25D, a specific parameter circuit is not specified, it will be simply referred to as a parameter circuit 25.

The control circuit 22 is equivalent to the control unit 12 described in the second exemplary embodiment. The selector 24 is equivalent to the selection unit 14 described in the second exemplary embodiment. The parameter circuits 25A to 25D are equivalent to the control information output units 13A to 13D described in the second exemplary embodiment, respectively.

The computer circuit 31 that is a load determines a prediction value of power necessary to operate. The computer circuit 31 outputs power prediction information 101R indicating the determined prediction value toward the power request circuit 21.

Figure 7:
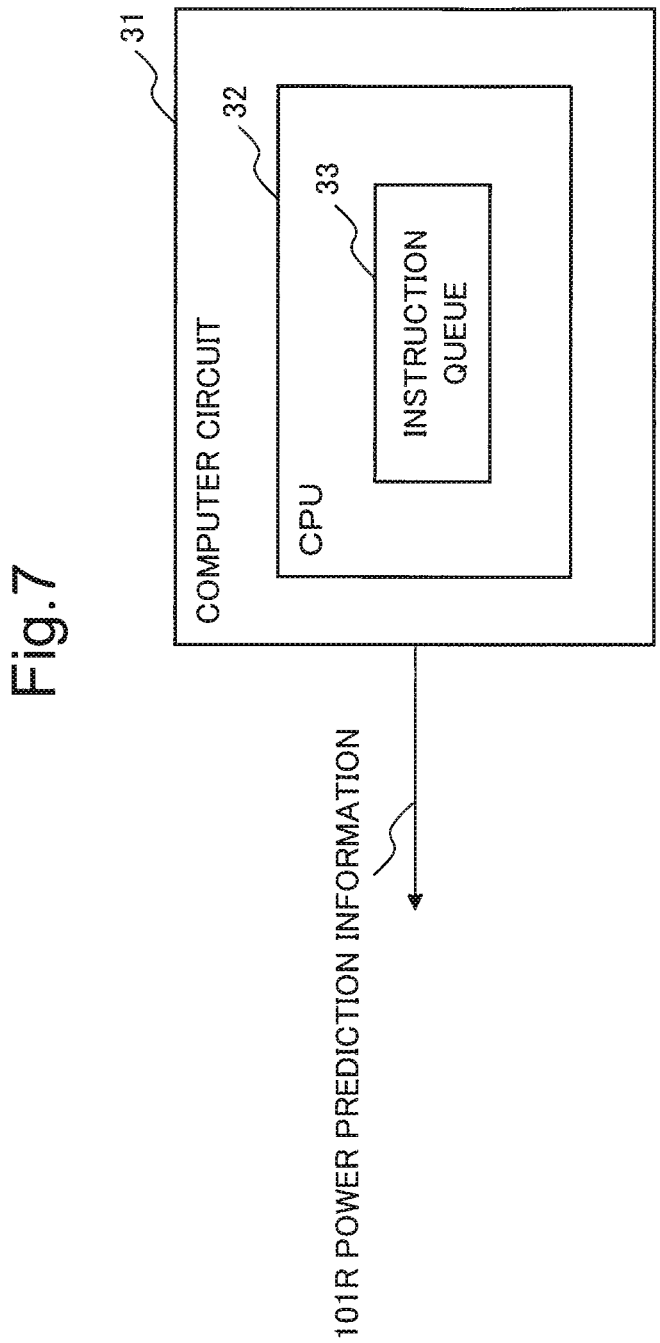
FIG. 7 is a block diagram illustrating a main part of a computer circuit in the specific example according to the second exemplary embodiment of the present invention.

FIG. 7 is a block diagram illustrating a main part of the computer circuit 31 in the specific example according to the second exemplary embodiment of the present invention.

In FIG. 7, the computer circuit 31 includes a CPU (Central Processing Unit) 32. As one example, for the CPU 32, an instruction queue 33 including a processing wait instruction will be conceptually exemplified.

In the following description, it is assumed that the computer circuit 31 determines power prediction information 101R, for example, on the basis of information of a processing wait instruction included in the instruction queue 33 in each predetermined time period. The computer circuit 31 outputs the determined power prediction information 101R toward the power request circuit 21. However, the present invention described using the present specific example as an example is not limited to the above-described configurations. A configuration may be employed which the power prediction information 101R is determined and output, for example, in accordance with an operation status of the computer circuit 31. Alternatively, the power prediction information 101R may be determined in such a manner that, for example, an external device (not illustrated) monitors operations of the load.

As a technology itself in which the load determines the prediction value of power on the basis of information of a number of processing wait instructions included in the instruction queue 33, a common technology is now employable. Therefore, detailed description in the present exemplary embodiment will be omitted.

In the following description, an operation of the power supply device 20 in the present specific example will be described more specifically.

Figure 8:
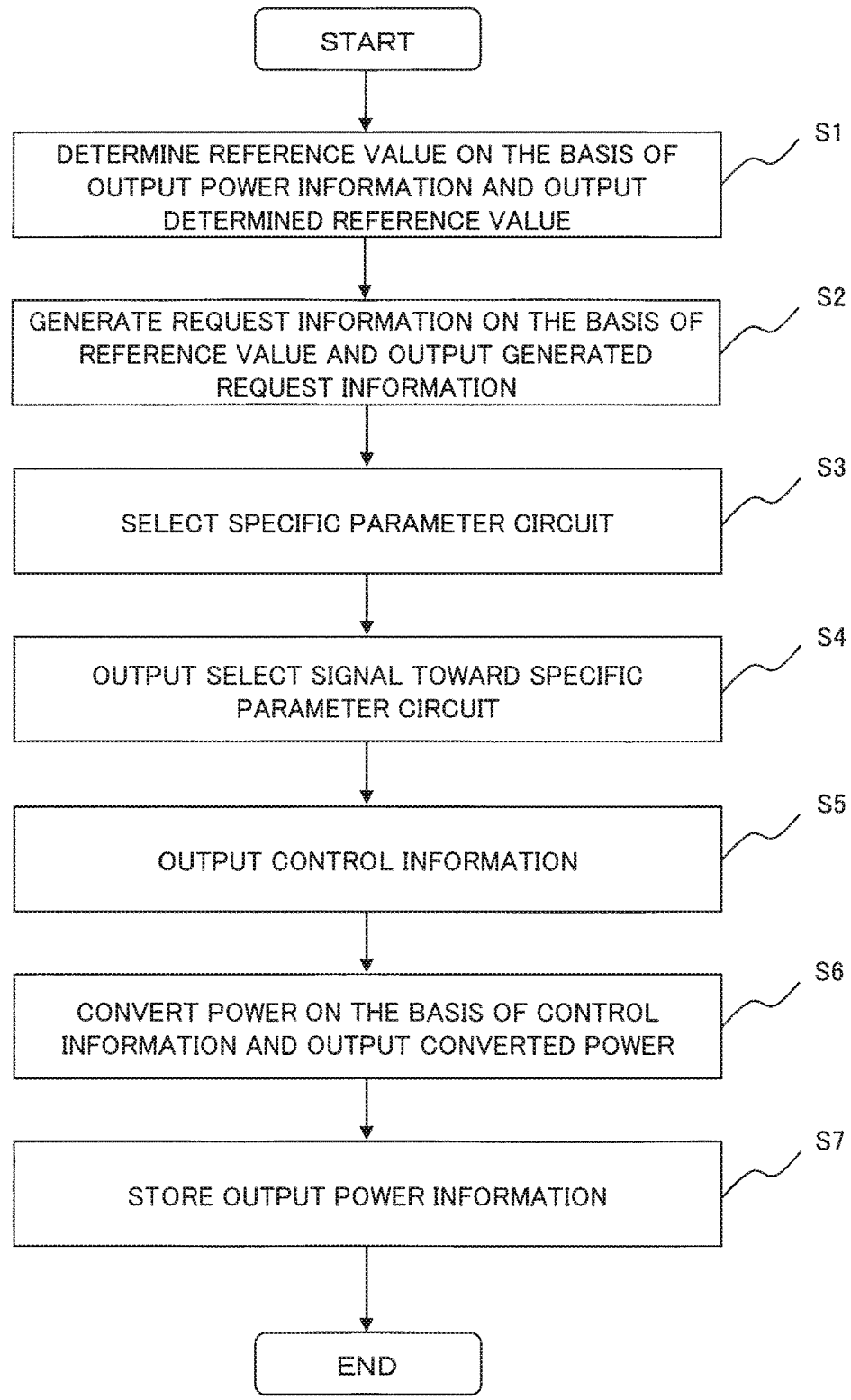
FIG. 8 is a flowchart illustrating operations performed by the power supply device in the specific example according to the second exemplary embodiment of the present invention.

FIG. 8 is a flowchart illustrating operations performed by the power supply device 20 in the specific example according to the second exemplary embodiment of the present invention. Along the flowchart, operation steps of the power supply device 20 will be described.

In the following description, it is assumed that the computer circuit 31 outputs power prediction information 101R toward the power request circuit 21. It is assumed that the buffer 29 stores power prediction information 101S and output power information 102S by being associated with each other on the basis of output power information 102R output from the power conversion circuit 23 in each predetermined time period.

The selector 28 of the power request circuit 21 uses the power prediction information 101R output from the computer circuit 31 as an input and selects any one buffer 29 of the buffers 29A to 29D. The arithmetic unit 30 determines an average value of power values indicated by specific output power information 102S accumulated on the selected buffer 29. In other words, the arithmetic unit 30 determines, on the basis of specific output power information 102S associated with power prediction information 101S, an average value of the output power information 102S. The arithmetic unit 30 outputs the determined average value toward the comparator 26 as the reference value (step S1).

In the following description, as one example, it is assumed that of the buffers 29A to 29D, the selector 28 selects the buffer 29A.

The comparator 26 uses the average value that is the reference value output from the arithmetic unit 30 as an input and generates request information 105 on the basis of the average value. The comparator 26 outputs the generated request information 105 toward the control circuit 22 (step S2).

More specifically, the comparator 26 compares the average value and the range of the predetermined power value. As a result of the comparison, the comparator 26 outputs request information 105 associated with the range of the predetermined power value including the average value toward the control circuit 22. In other words, the comparator 26 selects the range of the specific power value including the average value in the range from ranges of a plurality of power values. The comparator 26 outputs request information 105 associated with the selected range of the power value toward the control circuit 22.

The selector 24 of the control circuit 22 uses the request information 105 output from the comparator 26 as an input and refers to the output unit selection information 104. The selector 24 acquires information indicating the select signal capable of specifying the specific parameter circuit 25 associated with the request information 105 from the output unit selection information 104 (step S3). The selector 24 generates, on the basis of information indicating the acquired select signal, the select signal. The selector 24 asserts the select signal toward the specific parameter circuit 25 (step S4). In the following description, asserting means that, for example, a target object is caused to be active.

In the following description, it is assumed that the request information 105 indicates, for example, a value "1 h." Therefore, the selector 24 acquires a select signal of the parameter circuit 25B as a specific parameter circuit 25 associated with the value "1 h" indicated by the request information 105 from the output unit selection information 104 illustrated in FIG. 3. It is assumed that the selector 24 asserts the select signal toward the parameter circuit 25B.

The specific parameter circuit 25 outputs, to the power conversion circuit 23, control information that issues an instruction for adjusting the conversion efficiency in the power conversion circuit 23 using the conversion efficiency previously set as illustrated in FIG. 4 (step S5).

In the following description, as one example, it is assumed that the parameter circuit 25B outputs the control information toward the power conversion circuit 23.

The power conversion circuit 23 uses the control information output from the specific parameter circuit 25 as an input and converts power on the basis of the control information. The power conversion circuit 23 outputs the converted power (output power) toward the computer circuit 31 (step S6).

In this case, it is assumed that the power conversion circuit 23 outputs, to the power request circuit 21, for example, output power information 102R indicating the power value output to the computer circuit 31. In other words, it is assumed that the power conversion circuit 23 outputs the output power information 102R toward the storage circuit 27 of the power request circuit 21.

The buffer 29 selected by the selector 28 of the storage circuit 27 uses the output power information 102R output from the power conversion circuit 23 as an input and accumulates the output power information 102R. In other words, the buffer 29 stores the output power information 102R as output power information 102S (step S7).

In the present specific example, it is assumed that as described above, the selector 28 selects the buffer 29A. Therefore, it is assumed that the buffer 29A accumulates the output power information 102R as output power information 102S.

In this manner, the power supply device 20 can supply power necessary for the computer circuit 31 in accordance with an operation status of the computer circuit 31.

In the following description, as one example, operations upon a variation of the prediction value in accordance with an operation status of the computer circuit 31 will be described with reference to FIG. 9.

In the following description, for convenience of description, as one example, it is assumed that the computer circuit 31 outputs power prediction information 101R to the power request circuit 21 in accordance with a variation of the prediction value of power necessary to operate.

For convenience of description, the computer circuit 31 will be described using the above-described configuration as an example. However, the present invention described using the present exemplary embodiment as an example is not limited to the configuration.

Figure 9:
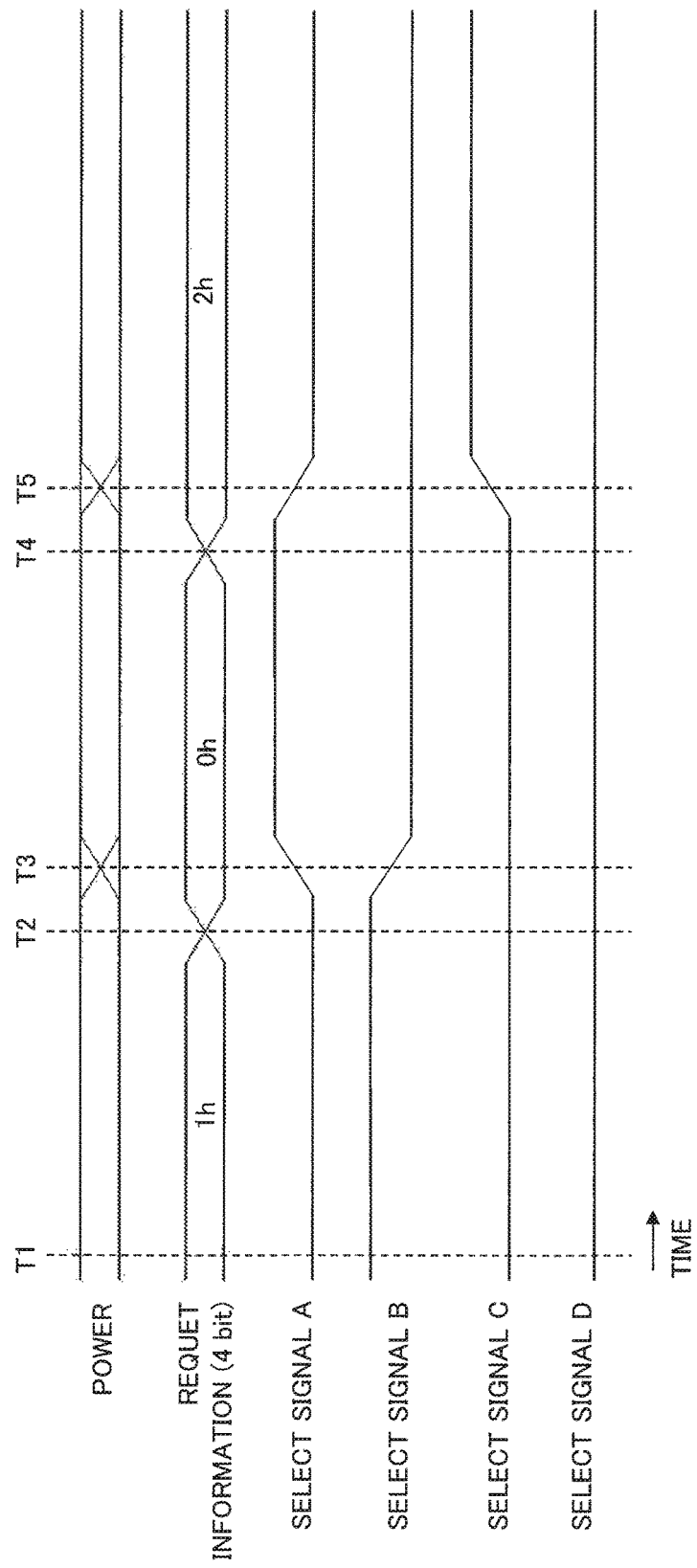
FIG. 9 is a time chart illustrating operations performed by the power supply device in the specific example according to the second exemplary embodiment of the present invention.

FIG. 9 is a time chart illustrating operations performed by the power supply device 20 in the specific example according to the second exemplary embodiment of the present invention. FIG. 9 is a time chart illustrating power output from the power conversion circuit 23, request information 105 associated with changes of power prediction information 101R, and time changes of select signals output from the selector 24.

The horizontal axis illustrated in FIG. 9 represents a time axis. Stages of the vertical direction sequentially represent the above-described power, request information 105, and select signals (select signals A to D). For convenience of description, as one example, it is assumed that the select signal A represents a signal capable of specifying the parameter circuit 25A. It is assumed that the select signal B represents a signal capable of specifying the parameter circuit 25B. It is assumed that the select signal C represents a signal capable of specifying the parameter circuit 25C. It is assumed that the select signal D represents a signal capable of specifying the parameter circuit 25D.

At a time T1 illustrated in FIG. 9, the power request circuit 21 uses power prediction information 101R-1 output from the computer circuit 31 as an input and executes processing illustrated in step S1 and step S2 of FIG. 8. Thereby, the comparator 26 of the power request circuit 21 outputs request information 105 toward the selector 24. In the present specific example, it is assumed that the request information 105 at the time of day T1 represents "1 h."

Therefore, it is assumed that the selector 24 asserts, for the parameter circuit 25B, a select signal B associated with "1 h" indicated by the request information 105 from the output unit selection information 104 illustrated in FIG. 3. The power conversion circuit 23 uses control information output from the parameter circuit 25B as an input and converts power on the basis of the control information. The power conversion circuit 23 outputs the converted power toward the computer circuit 31.

At a time T2 illustrated in FIG. 9, it is assumed that the computer circuit 31 outputs, to the power request circuit 21, power prediction information 101R-2 different from the power prediction information 101R-1 output at the time of day T1. The power request circuit 21 uses the power prediction information 101R-2 output from the computer circuit 31 as an input and executes processing illustrated in step S1 and step S2 of FIG. 8. Thereby, the comparator 26 outputs request information 105 toward the selector 24. In the present specific example, it is assumed that the request information 105 at the time of day T2 represents "0 h."

Therefore, at a time T3 illustrated in FIG. 9, it is assumed that the selector 24 asserts, for the parameter circuit 25A, the select signal A associated with "0 h" indicated by the request information 105 from the output unit selection information 104 illustrated in FIG. 3. The power conversion circuit 23 uses control information output from the parameter circuit 25A as an input and converts power on the basis of the control information. The power conversion circuit 23 outputs the converted power toward the computer circuit 31.

At a time T4 illustrated in FIG. 9, it is assumed that the computer circuit 31 outputs, to the power request circuit 21, power prediction information 101R-3 different from the power prediction information output at the time of day T1 and the time of day T2. The power request circuit 21 uses the power prediction information 101R-3 output from the computer circuit 31 as an input and executes processing illustrated in step S1 and step S2 of FIG. 8. Thereby, the comparator 26 outputs request information 105 toward the selector 24. In the present specific example, it is assumed that the request information 105 at the time of day T4 represents "2 h."

Therefore, at a time T5 illustrated in FIG. 9, it is assumed that the selector 24 asserts, for the parameter circuit 25C, the select signal C associated with "2 h" indicated by the request information 105 from the output unit selection information 104 illustrated in FIG. 3. The power conversion circuit 23 uses control information output from the parameter circuit 25C as an input and converts power on the basis of the control information. The power conversion circuit 23 outputs the converted power toward the computer circuit 31.

Through a series of such operations, the power supply device 20 can output power necessary in accordance with an operation status of the computer circuit 31 to the computer circuit 31. In other words, the power supply device 20 can output, even when the prediction value of power necessary for the computer circuit 31 varies, power following the variation toward the computer circuit 31. In other words, the power supply device 20 can optimize the conversion efficiency of power so as to be able to supply power necessary for the computer circuit 31.

In the above-described present specific example, for convenience of description, as one example, a configuration in which the power supply device 20 does not include the power request circuit 21 has been described as an example. However, the exemplary embodiments of the present invention are not limited to the configuration. A configuration may be employed which the power supply device 20 includes the power request circuit 21.

In this manner, according to the power supply device 20 of the present specific example, the effect described in each exemplary embodiment can be obtained. The power supply device 20 is suitably applicable to various types of devices including a power supply device.

The reason is that the power supply device 20 can optimize the conversion efficiency of power so as to be able to supply power necessary for the load using a relatively simple processing configuration.

Third Exemplary Embodiment

An overall exemplary embodiment of the power supply devices according to the above-described exemplary embodiments and specific example of the present invention will be described. In the following description, characteristic portions according to the present exemplary embodiment will be mainly described. In the following description, the same components as in the exemplary embodiments and the specific example are assigned with the same reference numerals, and therefore, overlapping description will be omitted.

A power supply control device 40 in the third exemplary embodiment of the present invention will be described with reference to FIG. 10.

Figure 10:
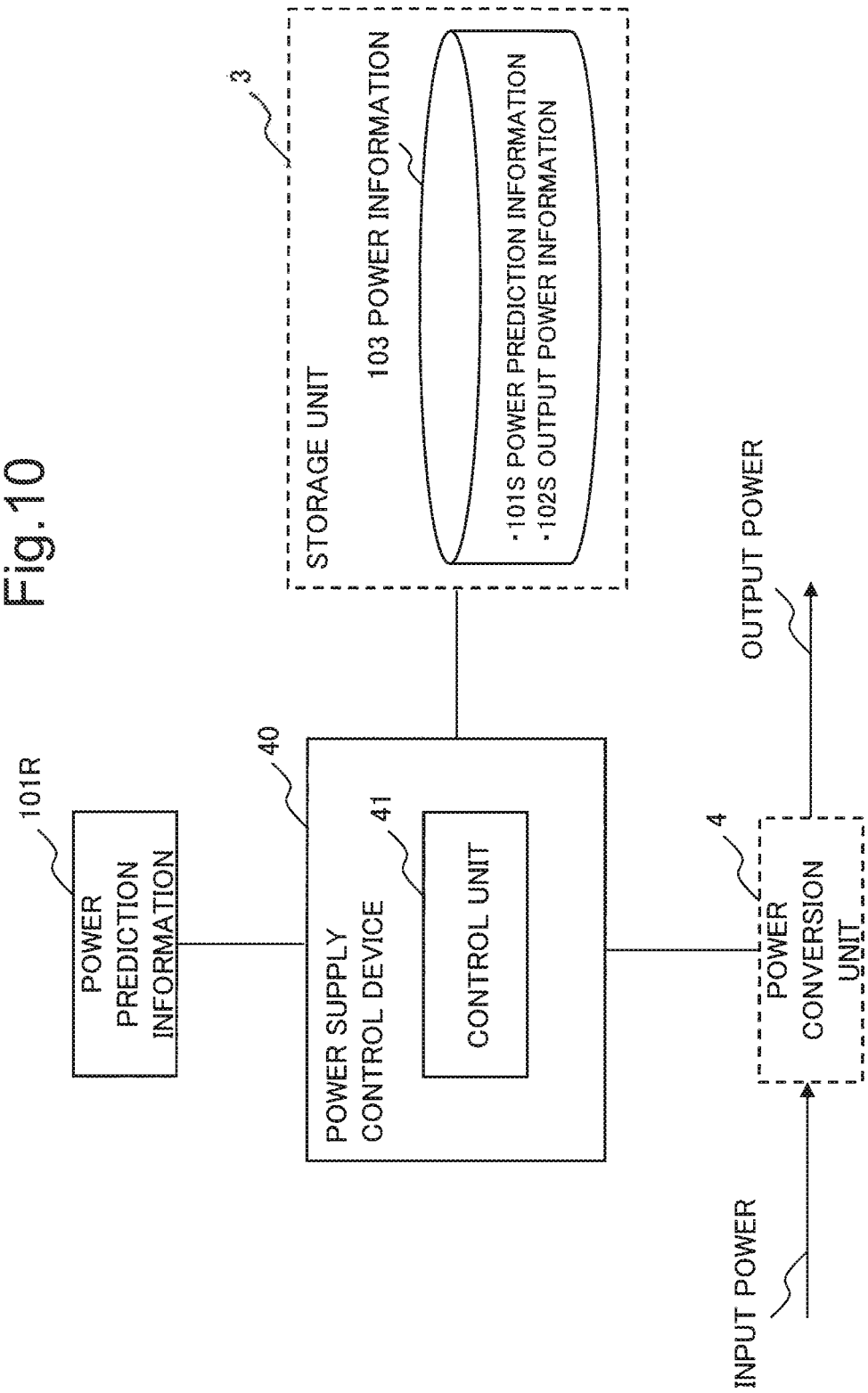
FIG. 10 is a block diagram illustrating a configuration of the power supply device in a third exemplary embodiment of the present invention.

FIG. 10 is a block diagram illustrating a configuration of the power supply control device 40 in the third exemplary embodiment of the present invention.

In FIG. 10, the power supply control device 40 includes a control unit 41.

The control unit 41 refers to, on the basis of new (newly input) power prediction information 101R, the storage unit 3 storing power information 103 in which power prediction information 101S and output power information 102S are associated with each other.

It is assumed that the power prediction information 101S represents past power prediction information of power prediction information indicating the prediction value of power necessary to operate the load (not illustrated) that is the supply target of power. It is assumed that the output power information 102S represents output power information indicating the power value output when the load actually operates for the prediction value indicated by the past power prediction information.

Thereby, the control unit 41 determines specific output power information 102S associated with past power prediction information 101S in the power information 103 corresponding to the new power prediction information 101R. The control unit 41 determines the reference value on the basis of the determined specific output power information 102S.

The control unit 41, in response to the determined reference value, controls the power conversion unit 4 to adjust the power conversion efficiency upon conversion from input power into output power by the power conversion unit 4.

The power supply device (not illustrated) may include a power supply control device 40, a power conversion unit 4, and a storage unit 3.

In this manner, according to the power supply control device 40 of the present specific example, it is possible to optimize the conversion efficiency of power so as to be able to supply, in accordance with an operation status of the load that is the supply target of power, power necessary for the load.

(Example of Hardware Structure)

Of the units illustrated in the corresponding drawings (FIG. 1, FIG. 2, FIG. 5, FIG. 6, and FIG. 10) in the above-described exemplary embodiments, at least the request unit, the control unit, the selection unit, the control information output unit, the comparator, the selector, the arithmetic unit, and the parameter circuit can be regarded as function units (processing units or software modules) of a software program. Each of these software modules may be realized using dedicated hardware. However, the division of the units illustrated in the drawings is a configuration for convenience of description, and upon mounting, various configurations may be supposed. One example of a hardware environment in this case will be described with reference to FIG. 11.

FIG. 11 is a diagram exemplarily illustrating a configuration of an information processing device (computer) 300 capable of executing a function of at least a control unit in a power supply device according to a typical exemplary embodiment of the present invention. In other words, FIG. 11 illustrates a configuration of a computer (information processing device) and represents a hardware environment capable of realizing the functions in the above-described exemplary embodiments. It is possible for the computer to realize the power supply device 1 (FIG. 1), or a part of the power supply device and a power supply control device of the power supply device 10 (FIG. 2), the power supply device 20 (FIG. 5), and the power supply control device 40 (FIG. 10).

The information processing device 300 illustrated in FIG. 11 is a common computer connected with the following components via a bus (communication line) 306.

CPU 301
ROM (Read_Only_Memory) 302
RAM (Random_Access_Memory) 303
Hard disk (storage device) 304
Communication interface (illustrated as COMMUNICATION I/F (Interface) in FIG. 11) 305 with an external device The present invention described using the above-described exemplary embodiments as examples is achieved by the following steps. A computer program capable of realizing a block configuration diagram (FIG. 1, FIG. 2, FIG. 5, FIG. 6, and FIG. 10) or functions of a flowchart (FIG. 8) referred to in the exemplary embodiments is supplied to the information processing device 300 illustrated in FIG. 11. The computer program is read out and executed by the CPU 301 of the hardware to be achieved. The computer program supplied onto the device may be stored on a readable temporary storage memory (RAM 303) or a non-volatile storage device such as the hard disk 304.

In the above case, as a supply method of the computer program onto the hardware, common steps are now employable. The supply method includes, for example, a method of installing onto the device via various types of recording media such as a CD-ROM and a method of downloading from the outside via a communication line such as the Internet. In such case, it is conceivable that the present invention includes codes configuring the computer program or a recording medium storing the codes.

The previous description of embodiments is provided to enable a person skilled in the art to make and use the present invention. Moreover, various modifications to these exemplary embodiments will be readily apparent to those skilled in the art, and the generic principles and specific examples defined herein may be applied to other embodiments without the use of inventive faculty. Therefore, the present invention is not intended to be limited to the exemplary embodiments described herein but is to be accorded the widest scope as defined by the limitations of the claims and equivalents.

Further, it is noted that the inventor's intent is to retain all equivalents of the claimed invention even if the claims are amended during prosecution.

DESCRIPTION OF REFERENCE NUMERALS

1 Power supply device
2 Control unit
3 Storage unit
4 Power conversion unit
10 Power supply device
11 Power request unit
12 Control unit
13A to 13D Control information output unit
14 Selection unit
15 Request unit
20 Power supply device
21 Power request circuit
22 Control circuit
23 Power conversion circuit
24, 28 Selector
25A to 25D Parameter circuit
26 Comparator
27 Storage circuit
29A to 29D Buffer
30 Arithmetic unit
31 Computer circuit
32 CPU
33 Instruction queue
40 Power supply control device
41 Control unit
101R, 101S Power prediction information
102R, 102S Output power information
103 Power information
104 Output unit selection information
105 Request information
106 Clock signal
300 Information processing device
301 CPU
302 ROM
303 RAM
304 Hard disk
305 Communication interface
306 Bus

The invention claimed is:

1. A power supply device
by referring to, on a basis of new power prediction information, a storage unit that stores power information in which, out of power prediction information indicating a prediction value of power necessary to operate a load that is a supply target of power, past power prediction information and output power information indicating a power value output when the load actually operates for a prediction value of the past power prediction information are associated with each other, determines the specific output power information associated with the past power prediction information included in the power information which corresponds to the new power prediction information;

determines a reference value on a basis of the determined specific output power information; and controls a power supply conversion unit to adjust, in accordance with the reference value, a power conversion efficiency upon conversion from input power into output power by the power supply conversion unit.

2. The power supply device according to claim 1, comprising:

a request unit that outputs request information that requests an adjustment of the power conversion efficiency in accordance with the determined reference value;

one or more control information output units that output, to the power conversion unit, control information that issues an instruction for adjusting a power conversion efficiency on a basis of the power conversion efficiency set in accordance with the request information; and a selection unit that selects any one control information output unit out of the one or more control information output units in accordance with the request information.

3. The power supply device according to claim 2, wherein the selection unit refers to output unit selection information in which the request information and information indicating a select signal that is able to specify the control information output unit are associated with each other, acquires, from the output unit selection information, information indicating a select signal that is able to specify the specific control information output unit associated with the request information obtained from the request unit, and outputs the select signal to the specific control information output unit on a basis of the acquired information indicating the select signal, and the specific control information output unit outputs, to the power conversion unit, the control information in accordance with an input of the select signal from the selection unit.

4. The power supply device according to claim 2, wherein the selection unit is able to adjust a time interval of outputting the select signal to the control information output unit.

5. The power supply device according to claim 2, wherein the one or more control information output units are set with the power conversion efficiencies different from each other in accordance with the request information for the respective control information output units.

6. The power supply device according to claim 2, wherein the request unit determines, as the reference value, an average value of power values indicated by the specific output power information, compares the determined reference value with a range of a predetermined power value, and outputs, when the determined reference value falls within the range of the predetermined power value, the request information associated with the range of the predetermined power value to the selection unit.

7. The power supply device according to claim 6, wherein the request unit determines whether or not it is necessary to adjust the power conversion efficiency on a basis of the reference value and the specific output power information, and outputs the request information to the selection unit when it is determined that it is necessary to adjust the power conversion efficiency.

8. The power supply device according to claim 1 that determines the past power prediction information included in the power information corresponding to the new power prediction information, determines the specific output power information associated with the determined past power prediction information, and determines the reference value on a basis of the determined specific output power information.

9. A power control method comprising, causing an information processing device by referring to, on a basis of new power prediction information, a storage unit that stores power information in which, out of power prediction information indicating a prediction value of power necessary to operate a load that is a supply target of power, past power prediction information and output power information indicating a power value output when the load actually operates for a prediction value of the past power prediction information are associated with each other, determining the specific output power information associated with the past power prediction information included in the power information which corresponds to the new power prediction information;

determining a reference value on a basis of the determined specific output power information; and controlling a power supply conversion unit to adjust, in accordance with the reference value, a power conversion efficiency upon conversion from input power into output power by the power supply conversion unit.

10. A non-transitory computer readable storage medium storing a computer program that causes a computer to realize a function that:

by referring to, on a basis of new power prediction information, a storage unit that stores power information in which, out of power prediction information indicating a prediction value of power necessary to operate a load that is a supply target of power, past power prediction information and output power information indicating a power value output when the load actually operates for a prediction value of the past power prediction information are associated with each other, determining the specific output power information associated with the past power prediction information included in the power information which corresponds to the new power prediction information;

determining a reference value on a basis of the determined specific output power information; and controlling a power supply conversion unit to adjust, in accordance with the reference value, a power conversion efficiency upon conversion from input power into output power by the power supply conversion unit.

* * * * *